US010452942B2

United States Patent
Chen et al.

(10) Patent No.: US 10,452,942 B2
(45) Date of Patent: Oct. 22, 2019

(54) SYSTEM AND METHOD FOR IMAGE RE-ORIENTATION

(71) Applicant: BEIJING DIDI INFINITY TECHNOLOGY AND DEVELOPMENT CO., LTD., Beijing (CN)

(72) Inventors: Xin Chen, Beijing (CN); Min Li, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 15/990,570

(22) Filed: May 25, 2018

(65) Prior Publication Data
US 2018/0322357 A1    Nov. 8, 2018

Related U.S. Application Data

(63) Continuation of application No. PCT/CN2017/083191, filed on May 5, 2017.

(51) Int. Cl.
*G06K 9/32* (2006.01)
*G06K 9/62* (2006.01)
(Continued)

(52) U.S. Cl.
CPC ....... *G06K 9/3208* (2013.01); *G06K 9/00483* (2013.01); *G06K 9/6257* (2013.01); *G06T 3/60* (2013.01)

(58) Field of Classification Search
CPC ........... G06K 2209/01; G06K 9/00463; G06K 9/00442; G06K 9/00456; G06K 9/3208;
(Continued)

(56) References Cited

U.S. PATENT DOCUMENTS 8,094,892 B2 * 1/2012 Mei ..................... G06K 9/00228
382/118
8,320,708 B2 * 11/2012 Kurzweil ................ G06T 5/006
356/138
(Continued)

FOREIGN PATENT DOCUMENTS

CN    104992403 A    10/2015
CN    105868758 A    8/2016

OTHER PUBLICATIONS

International Search Report in PCT/CN2017/083191 dated Feb. 9, 2018, 4 pages.
(Continued)

*Primary Examiner* — Andrew M Moyer
*Assistant Examiner* — Dennis Rosario
(74) *Attorney, Agent, or Firm* — Metis IP LLC

(57) ABSTRACT

Systems and methods are provided for image re-orientation. A computing system for image re-orientation may comprise one or more processors and a memory for storing instruction that, when executed by the processors, cause the system to perform: obtaining positive samples including text of a predetermined type in a predetermined orientation range and negative samples not including text of the predetermined type in the predetermined orientation range; training a model with the obtained positive and negative samples; receiving an image in an original orientation; applying the trained model to the received image; in response to determining that the received image does not comprise any text of the predetermined type in the predetermined orientation range, rotating the image by a predetermined angle and re-applying the trained model to the rotated image to determine if the rotated image comprises at least some text of the predetermined type in the predetermined orientation range.

16 Claims, 9 Drawing Sheets

(51) Int. Cl.
*G06T 3/60* (2006.01)
*G06K 9/00* (2006.01)

(58) Field of Classification Search
CPC .. G06K 9/6814; G06K 9/723; G06K 9/00409;
G06T 7/74; G06T 7/73; G06T 7/75;
G06T 3/00; G06T 3/60; G06T 7/70
See application file for complete search history.

(56) References Cited

U.S. PATENT DOCUMENTS

| | | | | |
|---|---|---|---|---|
| 8,422,783 | B2* | 4/2013 | Yuan | G06T 3/403 382/173 |
| 8,744,171 | B1* | 6/2014 | Smith | G06K 9/00429 382/159 |
| 9,152,860 | B2* | 10/2015 | Cervin | G06K 9/00483 |
| 9,367,736 | B1* | 6/2016 | Senechal | G06K 9/00463 |
| 9,367,770 | B2* | 6/2016 | Footen | G06K 9/78 |
| 2013/0329108 | A1 | 12/2013 | Nickel et al. | |
| 2014/0118256 | A1 | 5/2014 | Sonoda et al. | |

OTHER PUBLICATIONS

Written Opinion of the International Searching Authority in PCT/CNCN2017/083191 dated Feb. 9, 2018, 4 pages.

* cited by examiner

420

422: Obtain positive and negative samples, a positive sample including text of a predetermined type in a predetermined orientation ranges, and a negative sample not including text of the predetermined type in the predetermined orientation range

424: Train a model with the obtained positive and negative samples

426: Receive an image in an original orientation

428: Apply the trained model to the received image to determine if the received image is consistent with the positive samples or negative samples

430: In response to determining that the received image is consistent with the negative samples, rotate the image by a predetermined angle and re-apply the trained model to the rotated image to determine if the rotated image is consistent with the positive samples or negative samples, until determining that the rotated image is consistent with the positive samples or the image is rotated a predetermined number of degrees

432: In response to determining that the received or rotated image is consistent with the positive samples, retain the image's current orientation

FIG. 4B

SYSTEM AND METHOD FOR IMAGE RE-ORIENTATION

CROSS-REFERENCE TO RELATED APPLICATIONS

This application is a continuation of International Application No. PCT/CN2017/083191, filed on May 5, 2017, the contents of which are incorporated herein in its entirety by reference.

FIELD OF THE INVENTION

This disclosure generally relates to approaches and techniques for image re-orientation.

BACKGROUND

Cameras on mobile devices are commonly used for capturing images. Despite the portability and convenience, many challenges are present in processing the captured images.

SUMMARY

Various embodiments of the present disclosure can include systems, methods, and non-transitory computer readable media configured to perform image re-orientation. A computing system for image re-orientation may comprise one or more processors and a memory storing instructions that, when executed by the one or more processors, cause the system to obtain positive and negative samples. A positive sample may include text of a predetermined type in a predetermined orientation range, and a negative sample may not include text of the predetermined type in the predetermined orientation range. The instruction may further cause the system to perform: training a model with the obtained positive and negative samples, receiving an image in an original orientation, and applying the trained model to the received image to determine if the received image comprises at least some text of the predetermined type in the predetermined orientation range consistent with the positive samples. In response to determining that the received image does not comprise any text of the predetermined type in the predetermined orientation range, the instruction may further cause the system to perform: rotating the image by a predetermined angle and re-applying the trained model to the rotated image to determine if the rotated image comprises at least some text of the predetermined type in the predetermined orientation range, until determining that the rotated image comprises at least some text of the predetermined type in the predetermined orientation range consistent with the positive samples or that the received image is rotated a predetermined number of degrees. In response to determining that the received or rotated image comprises at least some text of the predetermined type in the predetermined orientation range, the instruction may further cause the system to perform: retaining the image's current orientation.

In some embodiments, the image at least may include document information. The document may be a driver's license.

In some embodiments, the predetermined type may comprise at least one of a title, a serial number, or a date.

In some embodiments, the predetermined orientation range may comprise a configurable degree of deviation from an upright orientation. For example, the predetermined orientation range may comprise 15 degrees from an upright orientation.

In some embodiments, the positive samples may include image portions comprising at least one of title, serial number, or date. The image portions may be oriented within 15 degrees from an upright orientation.

In some embodiments, the negative samples may include image portions that do not have title, serial number, or date orientated within 15 degrees from an upright orientation. The negative samples may include at least one of: images portions without title, serial number, or date; image portions comprising title, serial number; or date oriented more than 15 degrees from an upright orientation, or images comprising non-document text.

In some embodiments, rotating the received image by the predetermined angle and re-applying the trained model to the rotated image may comprise performing the following one or more rotations in a same direction until determining that the rotated image comprises at least some text of the predetermined type in the predetermined orientation range: rotating the image by 90 degrees from the original orientation and re-applying the trained model to determine if the rotated image comprises at least some text in the predetermined orientation range, rotating the image by 180 degrees from the original orientation and re-applying the trained model to determine if the rotated image comprises at least some text in the predetermined orientation range, and rotating the image by 270 degrees from the original orientation and re-applying the trained model to determine if the rotated image comprises at least some text in the predetermined orientation range.

In some embodiments, an image re-orientation method may comprise obtaining positive and negative samples. A positive sample may include text of a predetermined type in a predetermined orientation range, and a negative sample may not include text of the predetermined type in the predetermined orientation range. The image re-orientation method may further comprise training a model with the obtained positive and negative samples, receiving an image in an original orientation, and applying the trained model to the received image to determine if the received image is consistent with the positive samples or negative samples. The image re-orientation method may further comprise, in response to determining that the received image is consistent with the negative samples, rotating the image by a predetermined angle and re-applying the trained model to the rotated image to determine if the rotated image is consistent with the positive samples or negative samples, until determining that the rotated image is consistent with the positive samples or that the received image is rotated a predetermined number of degrees. The image re-orientation method may further comprise, in response to determining that the received or rotated image is consistent with the positive sample, retaining the image's current orientation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4B illustrates a flowchart of another example method for image re-orientation, in accordance with various embodiments.

DETAILED DESCRIPTION

Using mobile device cameras for capturing document (e.g., identification card) images poses several challenges, despite its convenience. Since the obtained image orientation depends on how the mobile device (e.g., cellphone, tablet, etc.) is oriented during the image capture (e.g., upside-down, sideways, etc.), the image as captured may not be in an upright position. When the document images as captured are uploaded for verification, inconsistent and incorrect image orientations are likely to cause difficulties for viewing. Thus, an image orientation correction mechanism is desirable.

In current technologies, image orientation correction depends on image orientation information (e.g., Exif information) stored in the header of an image file. However, not all mobile devices are equipped with orientation sensors to record such image orientation information, and some image formats (e.g., PNG) do not store such header information. Even if the image orientation information can be captured, it is still likely to be lost or corrupted during compression or other conversion processes. Therefore, the current technologies are inadequate for achieving image orientation correction.

Various embodiments described below can overcome such problems arising in the realm of image orientation. In various implementations, a computing system may be configured to obtain positive and negative samples and train a model with the obtained positive and negative samples. Upon receiving an image in an original orientation, the same computing system or another computing system having obtained the trained model may apply the trained model to perform image re-orientation. As such, even if the original orientation of the received image was not in the desired orientation (e.g., upright), the image can be rotated automatically and determined by the model to achieve re-orientation.

Figure 1:
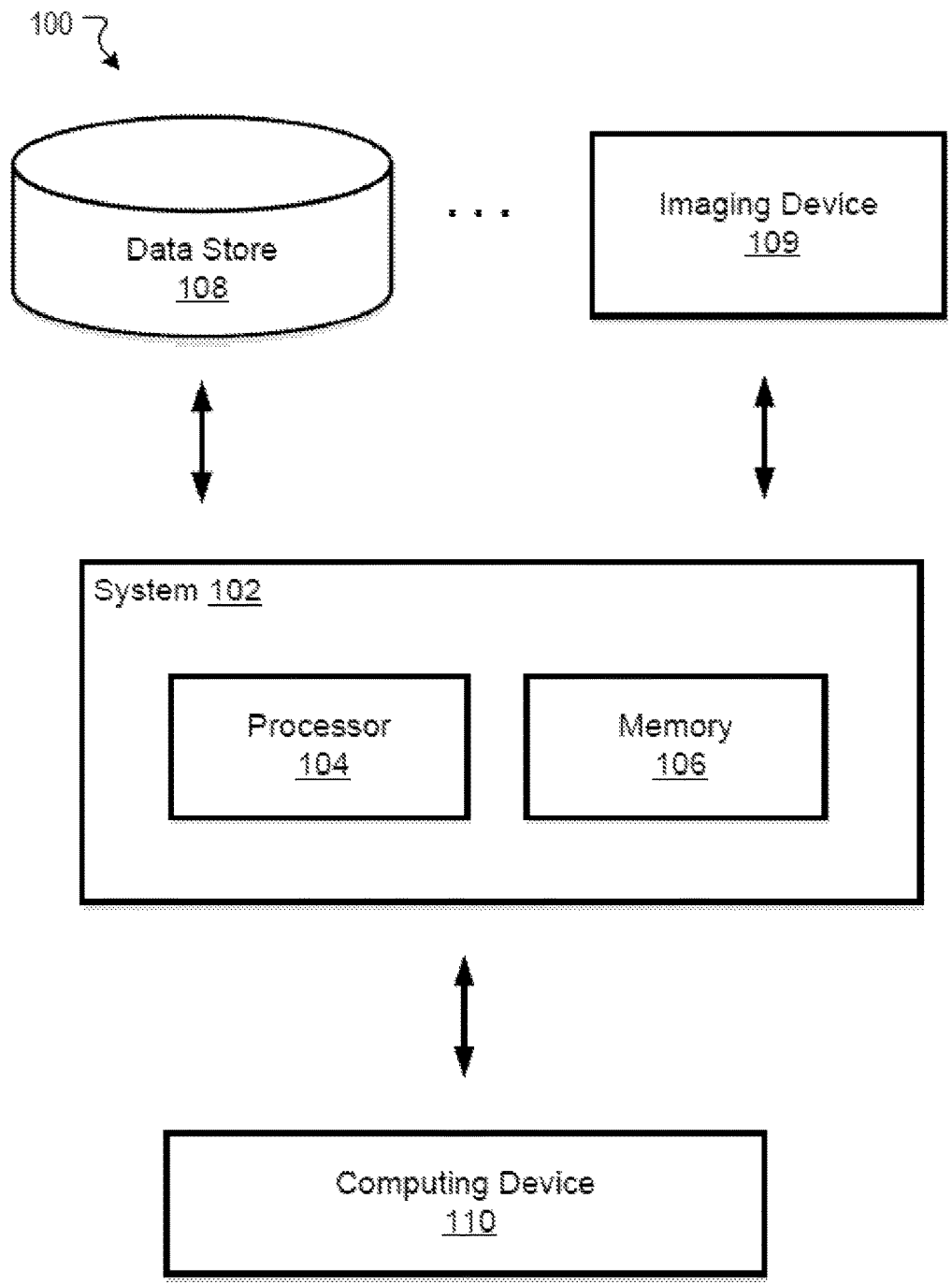
FIG. 1 illustrates an example environment for image re-orientation, in accordance with various embodiments.

FIG. 1 illustrates an example environment 100 for image re-orientation, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The environment 100 may also include a computing device 110 (e.g., a cellphone, a tablet, a computer, etc.) coupled to the system 102. The computing device 110 may have image storage and/or image capture functions. The environment 100 may further include one or more data stores (e.g., data store 108) and one or more imaging devices (e.g., imaging device 109) that are accessible to the system 102. For example, the data store 108 may store one or more positive and/or negative samples described below with reference to FIGS. 3A-B, and the imaging device 109 may capture one or more positive and/or negative samples.

In some embodiments, the system 102 and the computing device 110 may be integrated in a single device or system. Alternatively, the system 102 and the computing device 110 may operate as separate devices. For example, the computing device 110 may be a mobile device and the system 102 may be a server. The data store(s) may be anywhere accessible to the system 102, for example, in the memory 106, in the computing device 110, in another device (e.g., network storage device) coupled to the system 102, or another storage location (e.g., cloud-based storage system, network file system, etc.), etc. In general, the system 102, the computing device 110, the data store 108, and/or the imaging device 109 may be able to communicate with one another through one or more wired or wireless networks (e.g., the Internet) through which data can be communicated. Various aspects of the system 102 are described below in reference to FIG. 2 to FIG. 4B.

Figure 2:
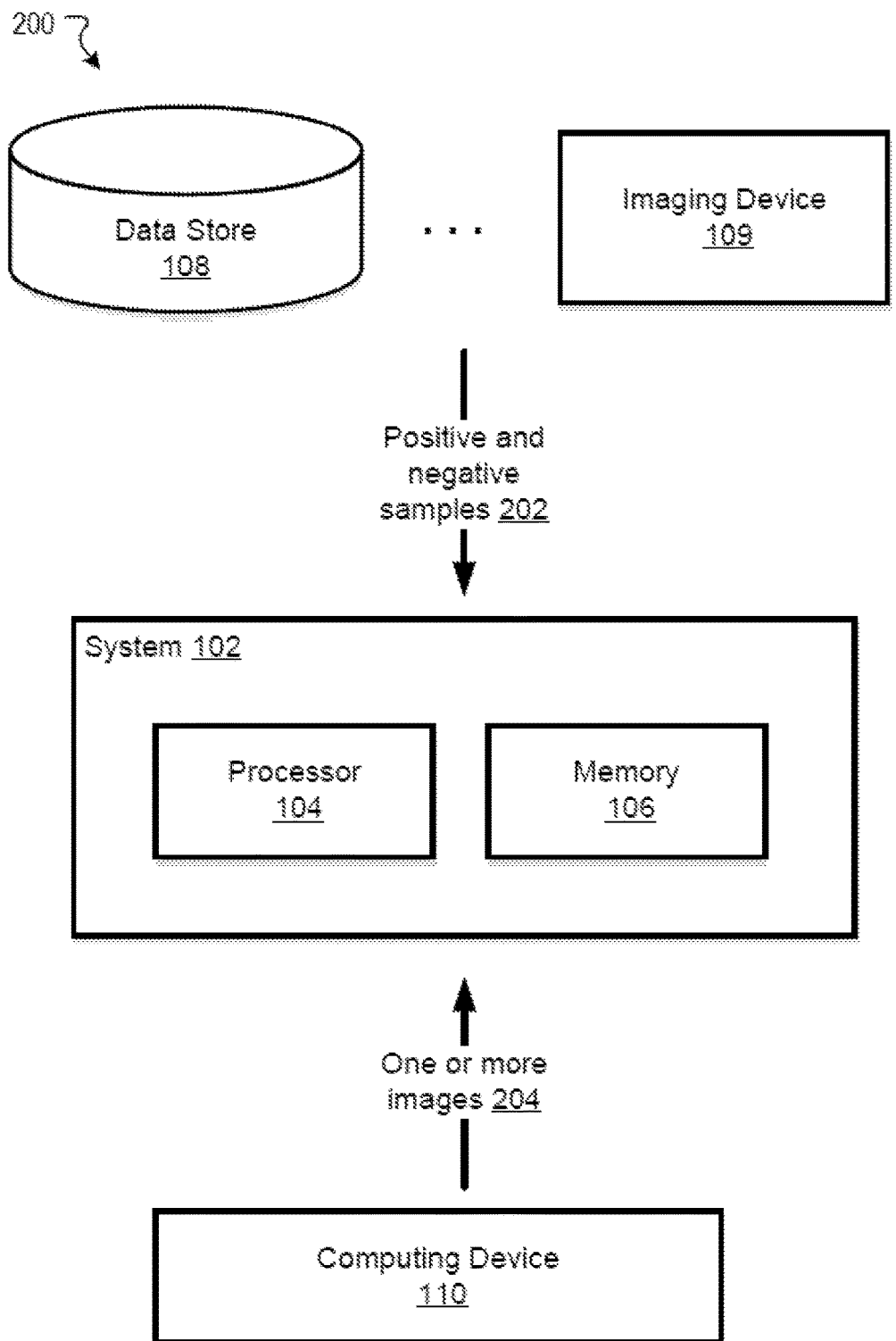
FIG. 2 illustrates an example system for image re-orientation, in accordance with various embodiments.

FIG. 2 illustrates an example system 200 for image re-orientation, in accordance with various embodiments. The operations shown in FIG. 2 and presented below are intended to be illustrative. In various embodiments, the system 102 may obtain one or more positive and/or negative samples 202 from the data store 108 and/or the imaging device 109. The positive and negative samples may include document information, the document including a citizen identification, a passport page, a driver's license, a name card, a receipt, an invoice, a photo of a person or scene, etc. In some embodiments, one or more images or image portions can be used as the positive and/or negative samples. A positive sample and a negative sample may be located on the same image or different images. In some embodiments, the positive samples may include image portions of a predetermined type and the image portions may be oriented within a predetermined orientation range (e.g., 15 degrees of deviation) from an upright orientation. The predetermined type may be a type that can be used to identify the documents, including title, serial number, data, etc. The predetermined orientation range may also be pre-set by a user, for example, plus and minus 15 degrees of deviation from an upright orientation. The predetermined type and orientation range may be configurable. In some embodiments, the negative samples may include all the samples that are not positive samples. The negative samples do not include any of the predetermined type (e.g., title, serial number, date, etc.) oriented within the predetermined orientation range (e.g., 15 degrees). For example, the negative samples may include: images portions that do not include title, serial number, or date; image portions that do not have any title, serial number, or date oriented within the predetermined orientation range (e.g., 15 degrees) from an upright orientation; and/or images comprising merely non-document text (e.g., an image capturing a portion of a newspaper, a photo of a person or scene, etc.). In some embodiments, positive samples, if rotated beyond the predetermined orientation range, can be used as negative samples. The predetermined orientation range may be suitable for text recognition by human, computer program, and/or machine. Positive and negative samples are described below with reference to FIGS. 3A-B, and a predetermined orientation range is described below with reference to FIG. 3C.

The system 102 may train a model with the positive and negative samples. In some embodiments, the model may include various computer vision functions (e.g., Cascade Classifier of OpenCV or another function of another software module). Based on the features of the positive and negative samples discussed above, the trained model can detect if a given image comprises image portions (e.g., title, serial number, date, etc.) consistent with (e.g., closer to) the positive samples or the negative samples. The degree of consistency may be determined based on a confidence level of how close the given image (or one or more portions of the given image) is to the positive or negative samples. The accuracy of the trained model can be verified with additional positive and/or negative samples. In some embodiments, the model can be constructed as follows: 1) extract LBP (Local Binary Pattern) features (e.g., title, serial number, date, etc.) from human-annotated positive and negative samples (e.g., samples determined by human as positive or negative), and 2) train a cascade classifier based on the extracted LBP features.

In various embodiments, a user may operate the computing device 110 to submit one or more images 204 to the system 102. In various embodiments, information sent and received between devices (e.g., the computing device 110, the system 102, etc.) can be transmitted over one or more computer networks (e.g., local area network, the Internet, etc.). In some embodiments, the one or more images 204 may at least include document information, such as information on a citizen identification, a passport page, a driver's license, a name card, a receipt, an invoice, etc. In some embodiments, the one or more images 204 may be uploaded to the system 102 for identity verification, profile establishment, etc.

The one or more images 204 may be processed (or executed) using the trained model. In various embodiments, to perform image re-orientation, the system 102 or another system having obtained the trained model may: receive the image in an original orientation and apply the trained model to the received image to determine if the received image comprises at least some text in a predetermined orientation range consistent with the positive samples. To that end, the trained classifier described above may be used to scan over the received image to search for one or more sub-regions of the received image, the sub-region comprising at least similar text(s) as the positive samples. In some embodiments, to apply the trained model to the received image to determine if the received image comprises at least some text in the predetermined orientation range consistent with the positive samples, the system may apply the trained model to the received image to detect if the received image comprises at least some text of a predetermined type (e.g., title, serial number, date, etc.) in the predetermined orientation range (e.g., within 15 degrees from an upright orientation) consistent with the positive samples. In response to determining that the received image does not comprise any text of the predetermined type in the predetermined orientation range, the system may rotate the image by a predetermined angle (e.g., 15, 30, 45, 60, or 90 degrees) and re-apply the trained model to the rotated image to determine if the rotated image comprises at least some text in the predetermined orientation range.

In some embodiments, the system may perform the rotation and determination for one or more times, until the system determines that the rotated image comprises at least some text of the predetermined type in the predetermined orientation range consistent with the positive samples or that the received imaged is rotated a predetermined number of degrees. The predetermined number of degrees can be preset by a user. For example, the predetermined number of degrees can be 360 degrees. In some embodiments, the predetermined number of degrees can be a number of degrees by which the last rotation will be at before the image is rotated 360 degrees. For example, if the image is rotated 90 degrees each time, the predetermined number of degrees can be 270 degrees. For another example, if the image is rotated 30 degrees each time, the predetermined number of degrees can be 330 degrees. At that point, the system is able to determine whether the image contains the predetermined-type text that can be oriented within the predetermined orientation range. In response to determining that the received or rotated image comprises at least some text of the predetermined type in the predetermined orientation range, the system may retain the image's current orientation. If none of the rotated images are determined to comprise at least some text of the predetermined type in the predetermined orientation range at each of the predetermined number of rotations, the system may determine the image as a non-document image.

In some embodiments, rotating the received image by the predetermined angle and re-applying the trained model to the rotated image may comprise performing the following one or more rotations in the same direction (clockwise or anticlockwise) until determining that the rotated image comprises at least some text of the predetermined type in the predetermined orientation range: rotating the image by 90 degrees from the original orientation and re-applying the trained model to determine if the rotated image comprises at least some text in the predetermined orientation range; rotating the image by 180 degrees from the original orientation and re-applying the trained model to determine if the rotated image comprises at least some text in the predetermined orientation range; and rotating the image by 270 degrees from the original orientation and re-applying the trained model to determine if the rotated image comprises at least some text in the predetermined orientation range. A rotation example is described below with reference to FIG. 3D.

Figure 3A:
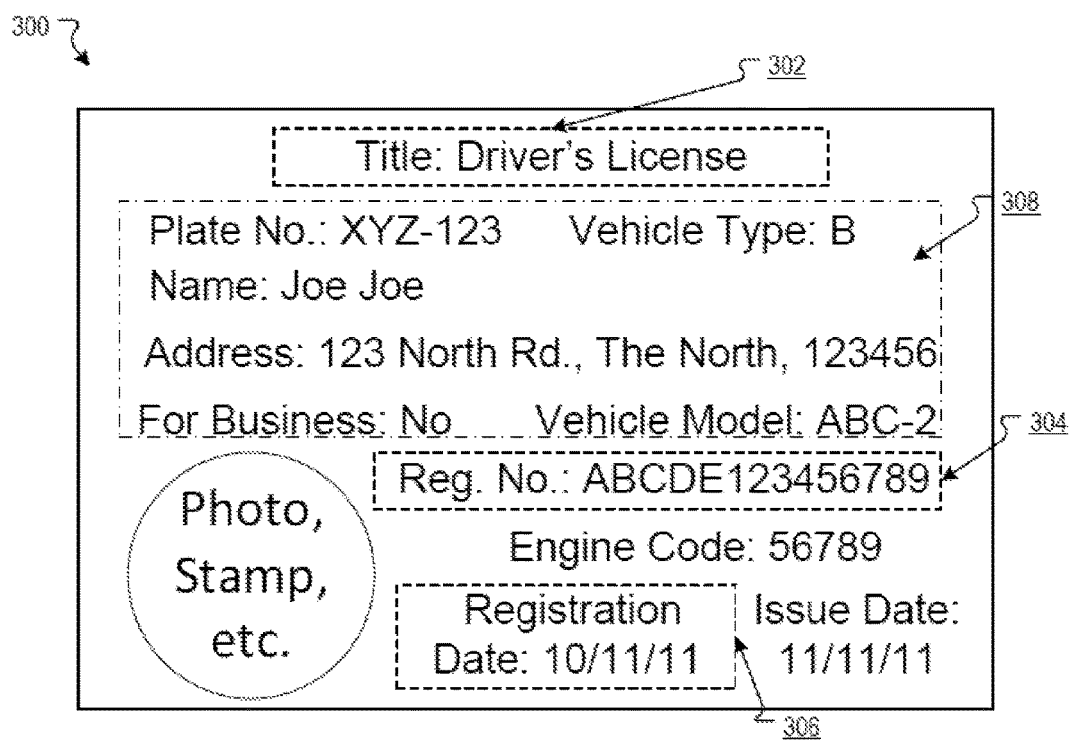
FIG. 3A illustrates a sample for model training, in accordance with various embodiments.

FIG. 3A illustrates an image sample 300 for model training, in accordance with various embodiments. The description of FIG. 3A is intended to be illustrative and may be modified in various ways according to the implementation. The sample 300 may be provided by a data store (e.g., the data store 108) and/or an imaging device (e.g., the imaging device 109) and accessed by a computing system or device (e.g., the system 102). In some embodiments, the positive sample may be presented through a display screen of the system 102. In some embodiments, the positive sample may be provided to a software application running on the system 102 to train a model.

The sample 300 (e.g., a document image) may comprise positive and/or negative samples. A positive sample may including images or image portions capturing at least some text in a predetermined orientation range (e.g., within 15 degrees of deviation from the upright orientation). The text may comprise title, serial number, and/or date. The negative samples may include images or image portions that do not include title, serial number, and date in the predetermined orientation range. As shown in FIG. 3A, the document as an image sample can be a driver's license, including a document title 302, a plate number, a name, a vehicle type, an address, a vehicle purpose description, a vehicle model, a vehicle registration number 304 (e.g., expressed as a serial number), an engine code, a registration date 306, an issue date, and a photo or stamp. Since the driver's license is orientated upright in this example, the document title 302, the vehicle registration number 304, and the registration date 306 are all within the predetermined orientation range and can be used as positive samples. Other information (e.g., image portion 308 including the plate number, the vehicle type, the name, the address, the vehicle purpose description, and the vehicle model) can be used as negative samples. In this example, the title 302 is "Driver's License", the vehicle registration number is a combination of letter and number of a fixed length, and the date is a combination of numbers in a fixed range. Thus, training the model with these positive and negative samples can allow the trained model to detect predetermined text type (e.g., title, vehicle registration number, and date) from a given image. Nevertheless, the positive samples are not limited to title, vehicle registration, and registration date. Other information (e.g., other texts with a predictable format and content) can be used as predetermined type or text in positive or negative samples according to the application.

Figure 3B:
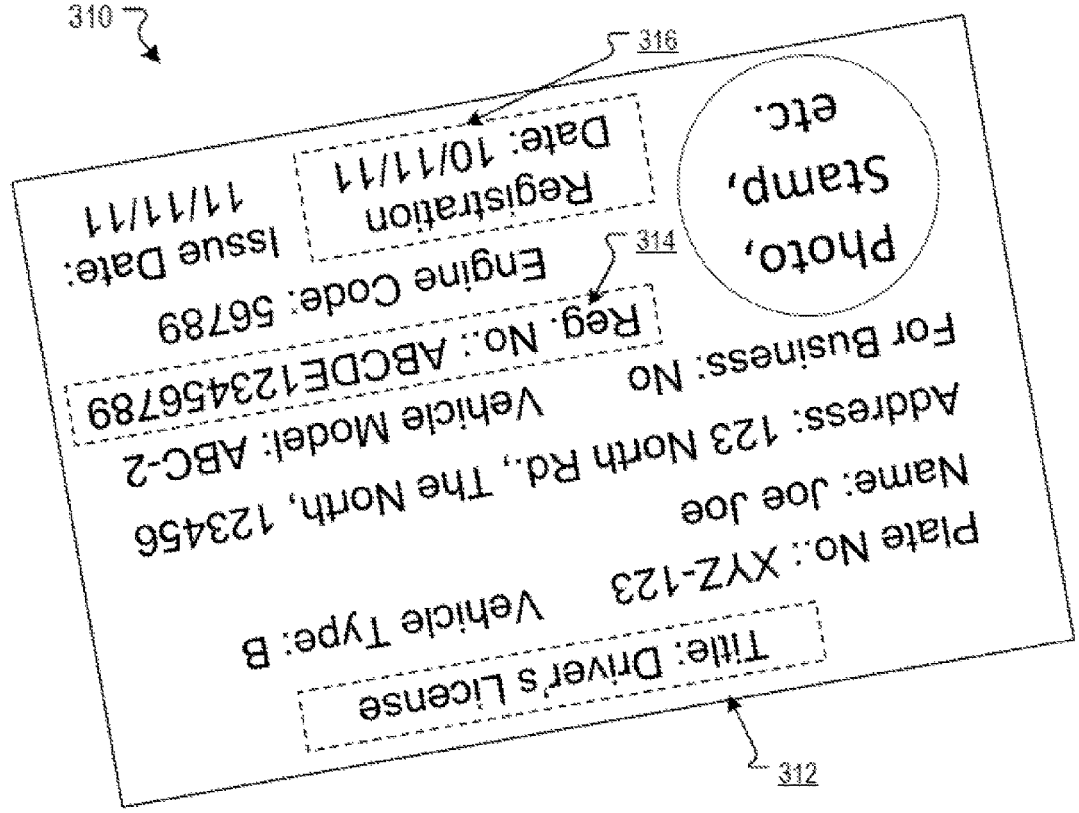
FIG. 3B illustrates another sample for model training, in accordance with various embodiments.

FIG. 3B illustrates a negative sample 310 for model training, in accordance with various embodiments. The description of FIG. 3B is intended to be illustrative and may be modified in various ways according to the implementation. The negative sample 310 may be provided by a data store (e.g., the data store 108) and/or an imaging device (e.g., the imaging device 109) and accessed by a computing system or device (e.g., the system 102). In some embodiments, the negative sample may be presented through a display screen of the system 102. In some embodiments, the negative sample may be provided to a software application running on the system 102 to train a model.

The negative samples may include images or image portions oriented outside the predetermined orientation range (e.g., more than 15 degrees clockwise or anticlockwise from an upright orientation). In the example shown in FIG. 3B, the title 312, vehicle registration number 314, and registration date 316 are almost upside-down and can be used as negative samples.

Figure 3C:
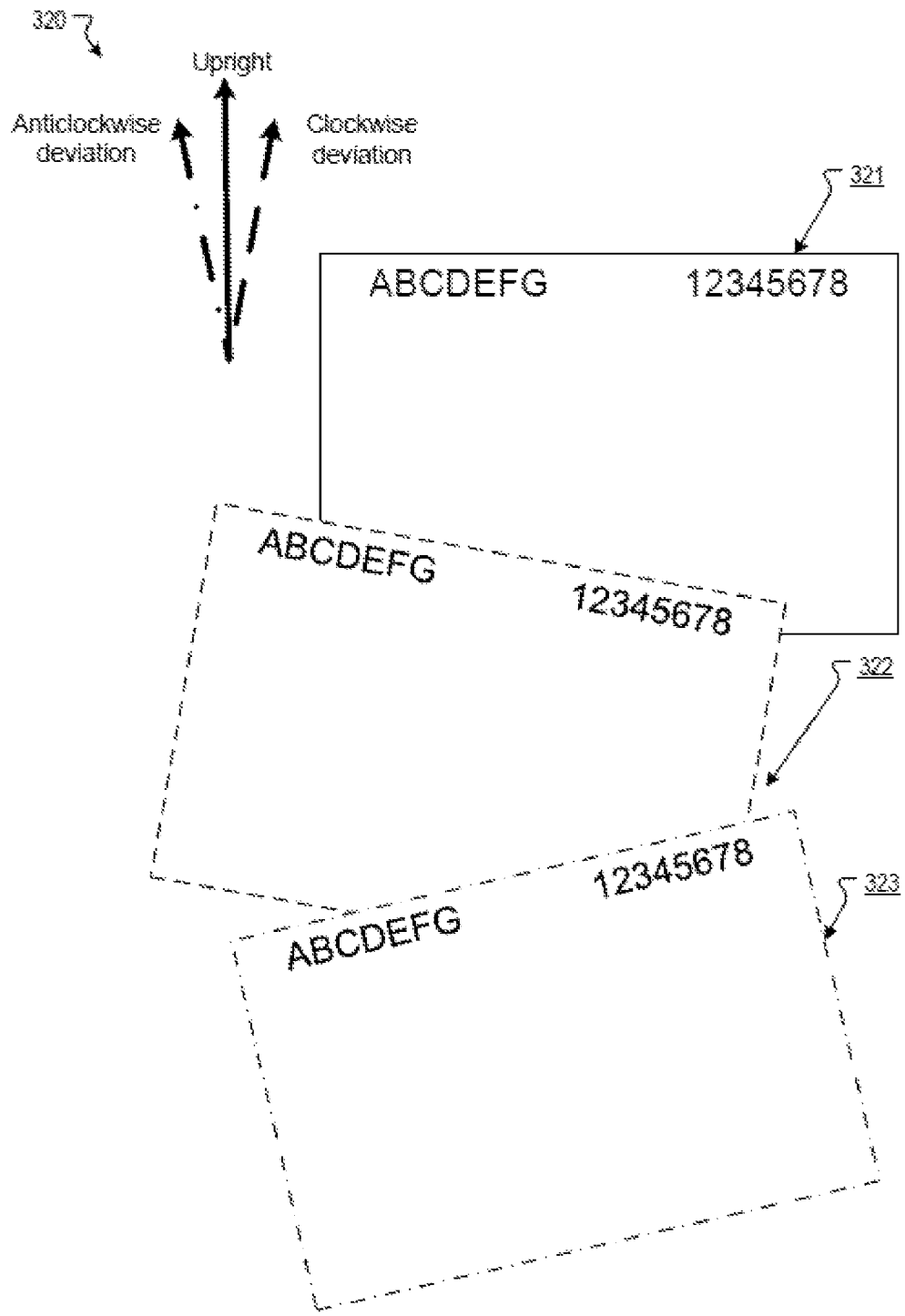
FIG. 3C illustrates an example predetermined orientation range, in accordance with various embodiments.

FIG. 3C illustrates an example predetermined orientation range 320, in accordance with various embodiments. The description of FIG. 3C is intended to be illustrative and may be modified in various ways according to the implementation. As shown, the example orientation range 320 may include a clockwise/anticlockwise deviation from an upright orientation. The degree of deviation may be predetermined and configurable (e.g., 8, 10, 15, 20, or 30 degrees). An basis for predetermining the degree of deviation may be an acceptable orientation range for recognizing text in the images. Accordingly, the image 321 oriented upright, the image 322 orientated at +15 degrees from upright and the image 323 orientated at −15 degrees from upright both fall within the predetermined orientation range.

Figure 3D:
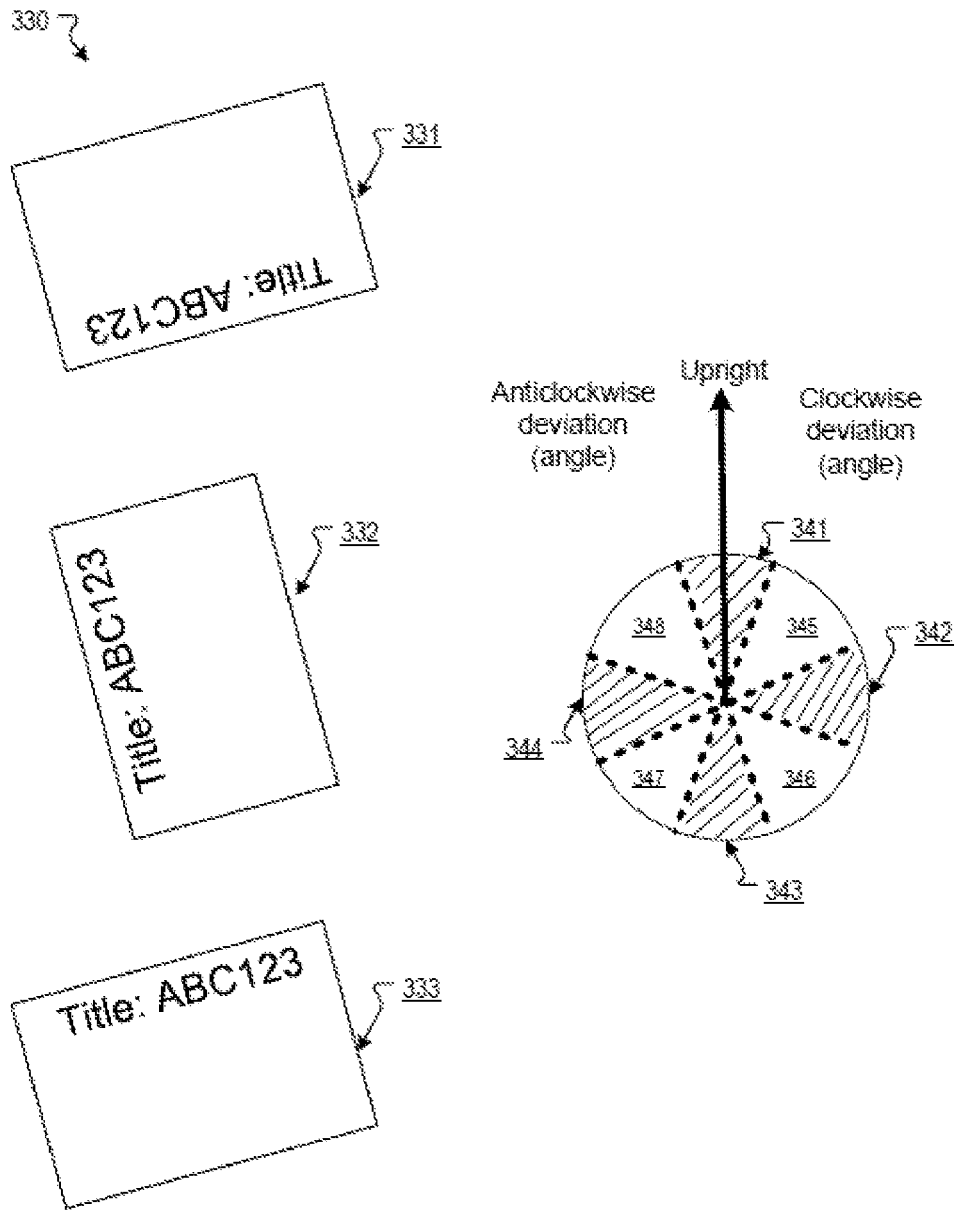
FIG. 3D illustrates example rotations in an image re-orientation process, in accordance with various embodiments.

FIG. 3D illustrates example rotations in an image re-orientation process 330, in accordance with various embodiments. The description of FIG. 3D is intended to be illustrative and may be modified in various ways according to the implementation. For example, the degree of rotation described below may be another angle other than 90 degrees (e.g., 15, 30, 45, or 60 degrees). In some embodiments, the image re-orientation process 330 may be presented through a display screen of the system 102. In some embodiments, the image re-orientation process 330 may be implemented by the system 102 (e.g., by a software application running on the system 102, the software comprising the trained model described above).

In various embodiments, the computing device 110 may upload an image (e.g., image 331) with its original orientation to the system 102. In applying the trained model to the image 331, the system 102 may determine that the image 331 does not comprise any text or any predetermined type of text in the predetermined orientation range (e.g., up to 15 degrees from upright). Accordingly, the system 102 may rotate the image 331 by 90 degrees to obtain the image 332. Re-applying the trained model to the image 332, the system 102 may determine that the image 332 does not comprise any text or any predetermined type of text in the predetermined orientation range. Accordingly, the system 102 may rotate the image 332 by another 90 degrees to obtain the image 333. Re-applying the trained model to the image 333, the system 102 may determine that the image 333 comprises some predetermined-type text (e.g., the title) in the predetermined orientation range and retain the current orientation of the image 333. Thus, the uploaded image 331 is re-orientated to image 333 with improved readability.

In various embodiments, provided that the image comprises recognizable texts of the predetermined type, an image orientation in a certain orientation range (e.g., orientation range 341, 342, 343, or 344 that are rotationally symmetric by 90 degrees) can be re-orientated by the rotation method discussed above. Images in other orientations (e.g., orientation range 345, 346, 347, or 348 that are rotationally symmetric by 90 degrees) may not be re-orientated even by the rotation method. To the extent that the readability is maintained, arbitrarily increasing the predetermined orientation range (e.g., the orientation range 341) can allow more images to be re-oriented. Images that cannot be re-oriented by the methods described herein may be filtered out and processed manually.

Figure 4A:
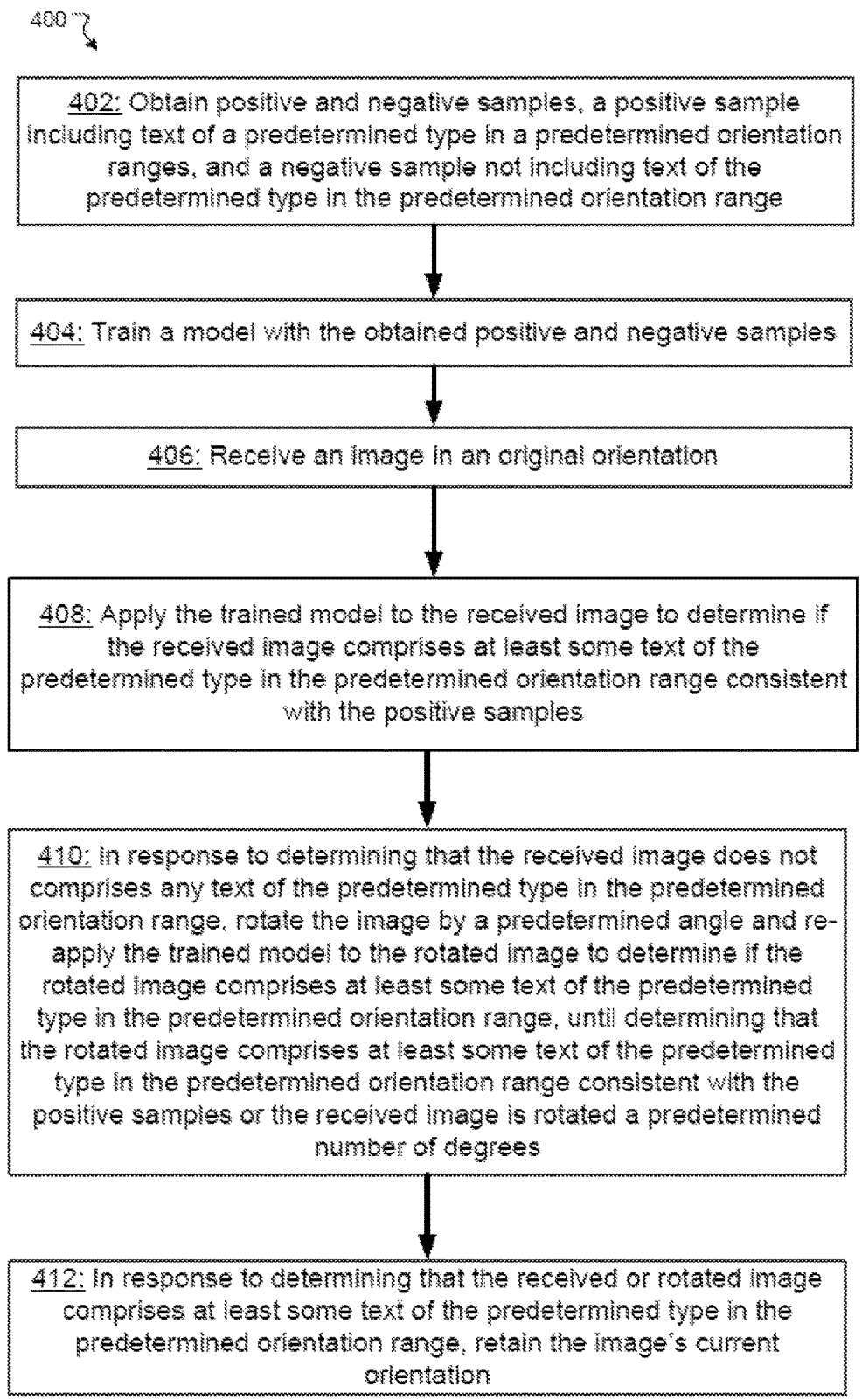
FIG. 4A illustrates a flowchart of an example method for image re-orientation, in accordance with various embodiments.

FIG. 4A illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors of one or more servers.

At block 402, positive and negative samples are obtained. A positive sample includes text of a predetermined type in a predetermined orientation ranges, and a negative sample does not include text of the predetermined type in the predetermined orientation range. At block 404, a model is trained with the obtained positive and negative samples. At block 406, an image in an original orientation is received. At block 408, the trained model is applied to the received image to determine if the received image comprises at least some text of the predetermined type in the predetermined orientation range consistent with the positive samples. At block 410, in response to determining that the received image does not comprise any text of the predetermined type in the predetermined orientation range, the image is rotated by a predetermined angle and the trained model is re-applied to the rotated image to determine if the rotated image comprises at least some text of the predetermined type in the predetermined orientation range. The block 410 may be performed for one or more times, until determining that the rotated image comprises at least some text of the predetermined type in the predetermined orientation range consistent with the positive samples or that the received image is rotated a predetermined number of degrees. At block 412, in response to determining that the received or rotated image comprises at least some text of the predetermined type in the predetermined orientation range, the image's current orientation is retained. The block 412 may be performed after the block 408 and/or after the block 410.

FIG. 4B illustrates a flowchart of an example method 420, according to various embodiments of the present disclosure. The method 420 may be implemented in various environments including, for example, the environment 100 of FIG. 1. The operations of method 420 presented below are intended to be illustrative. Depending on the implementation, the example method 420 may include additional, fewer, or alternative steps performed in various orders or in parallel. The example method 420 may be implemented in various computing systems or devices including one or more processors of one or more servers.

At block 422, positive and negative samples are obtained. A positive sample includes text of a predetermined type in a predetermined orientation ranges, and a negative sample does not include text of the predetermined type in the predetermined orientation range. At block 424, a model is trained with the obtained positive and negative samples. At block 426, an image in an original orientation is received. At block 428, the trained model is applied to the received image to determine if the received image is consistent with the positive samples or negative samples. At block 430, in response to determining that the received image is consistent with the negative samples, the image is rotated by a predetermined angle and the trained model is re-applied to the rotated image to determine if the rotated image is consistent with the positive or negative samples, until determining that the rotated image is consistent with the positive samples or the image is rotated a predetermined number of degrees. The block 430 may be performed for one or more times, until determining that the rotated image comprises at least some text of the predetermined type in the predetermined orientation range consistent with the positive samples or that the received image is rotated a predetermined number of degrees. The block 430 may comprise performing the following one or more rotations in a same direction: rotating the image by 90 degrees from the original orientation and re-applying the trained model to determine if the rotated image is consistent with the positive or negative samples; rotating the image by 180 degrees from the original orientation and re-applying the trained model to determine if the rotated image is consistent with the positive or negative samples; and rotating the image by 270 degrees from the original orientation and re-applying the trained model to determine if the rotated image is consistent with the positive or negative samples. Though each rotation is described as 90 degrees here, it should be appreciated that the degree of rotation is not limited to certain angles and can be configurable or preset as discussed above. For example, the degree of rotation may be another angle other than 90 degrees (e.g., 15, 30, 45, or 60 degrees). Applying large rotation angles (e.g., 90 degrees) offers higher efficiency and shorter processing time, and applying smaller rotation angles (e.g., 30 degrees) offers greater alignment with the upright orientation. Thus, the degree of rotation can be configured depending on the requirement for processing time and tolerance for the upright alignment. At block 432, in response to determining that the received or rotated image is consistent with the positive samples, the image's current orientation is retained. The block 432 may be performed after the block 428 and/or after the block 430.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
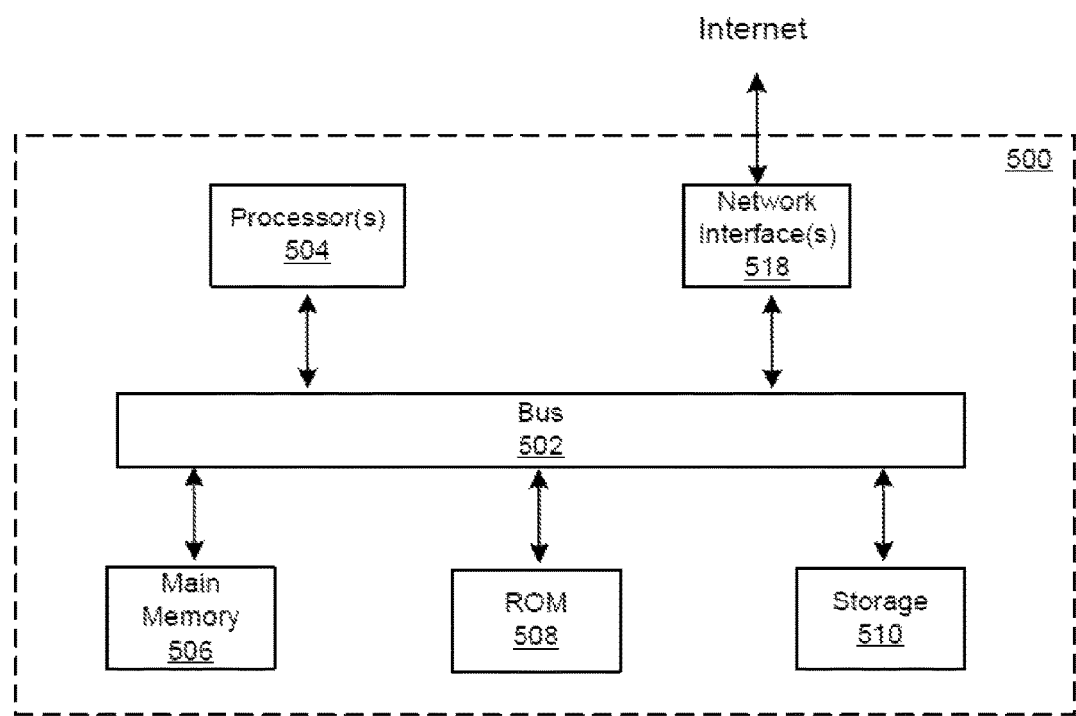
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computing system for image re-orientation, comprising:
   a memory storing instructions; and
   one or more processors in communication with the memory, wherein when executing the instructions, the one or more processors are configured to cause the system to:
   obtain positive and negative samples, wherein a positive sample includes text of a predetermined type in a predetermined orientation range, and a negative sample does not include text of the predetermined type in the predetermined orientation range;
   train a model with the obtained positive and negative samples;
   receive an image in an original orientation;
   apply the trained model to the received image to determine if the received image comprises at least some text of the predetermined type in the predetermined orientation range consistent with the positive samples;
   in response to determining that the received image does not comprise any text of the predetermined type in the predetermined orientation range, rotate the image by a predetermined angle and re-apply the trained model to the rotated image to determine if the rotated image comprises at least some text of the predetermined type in the predetermined orientation range, until determining that the rotated image comprises at least some text of the predetermined type in the predetermined orientation range consistent with the positive samples or that the received image is rotated a predetermined number of degrees; and
   in response to determining that the received or rotated image comprises at least some text of the predetermined type in the predetermined orientation range, retain the image's current orientation.

2. The system of claim 1, wherein the image at least includes document information.

3. The system of claim 2, wherein the document is a driver's license.

4. The system of claim 1, wherein:
   the predetermined type comprises at least one of a title, a serial number, or a date.

5. The system of claim 1, wherein:
   the predetermined orientation range comprises a configurable degree of deviation from an upright orientation.

6. The system of claim 5, wherein:
   the predetermined orientation range comprises 15 degrees from an upright orientation.

7. The system of claim 1, wherein:
   the positive samples include image portions comprising at least one of title, serial number, or date oriented within 15 degrees from an upright orientation; and
   the negative samples include image portions that do not have title, serial number, or date oriented within 15 degrees from the upright orientation.

8. The system of claim 1, wherein to rotate the received image by the predetermined angle and to re-apply the trained model to the rotated image until determining that the rotated image comprises at least some text of the predetermined type in the predetermined orientation range consistent with the positive samples or that the received image is rotated a predetermined number of degrees, the one or more processors are further configured to cause the system to perform the following one or more rotations in a same direction:
   rotating the image by 90 degrees from the original orientation and re-applying the trained model to determine if the rotated image comprises at least some text in the predetermined orientation range;

rotating the image by 180 degrees from the original orientation and re-applying the trained model to determine if the rotated image comprises at least some text in the predetermined orientation range; and rotating the image by 270 degrees from the original orientation and re-applying the trained model to determine if the rotated image comprises at least some text in the predetermined orientation range.

9. An image re-orientation method, comprising:

obtaining positive and negative samples, wherein a positive sample includes text of a predetermined type in a predetermined orientation range, and a negative sample does not include text of the predetermined type in the predetermined orientation range; training a model with the obtained positive and negative samples; receiving an image in an original orientation;

applying the trained model to the received image to determine if the received image comprises at least some text of the predetermined type in the predetermined orientation range consistent with the positive samples;

in response to determining that the received image does not comprise any text of the predetermined type in the predetermined orientation range consistent with the negative samples, rotating the image by a predetermined angle and re-applying the trained model to the rotated image to determine if the rotated image comprises at least some text of the predetermined type in the predetermined orientation range, until determining that the rotated image comprise at least some text of the predetermined type in the predetermined orientation range consistent with the positive samples or that the received image is rotated a predetermined number of degrees; and in response to determining that the rotated image comprises at least some text of the predetermined type in the predetermined orientation range, retaining the image's current orientation.

10. The method of claim 9, wherein the image at least includes document information.

11. The method of claim 10, wherein the document is a driver's license.

12. The method of claim 9, wherein:

the predetermined type comprises at least one of a title, a serial number, or a date.

13. The method of claim 9, wherein:

the predetermined orientation range comprises a configurable degree of deviation from an upright orientation.

14. The method of claim 13, wherein:

the predetermined orientation range comprises 15 degrees from an upright orientation.

15. The method of claim 9, wherein:

the positive samples include image portions comprising at least one of title, serial number, or date oriented within 15 degrees from an upright orientation; and the negative samples include image portions that do not have title, serial number, or date oriented within 15 degrees from the upright orientation.

16. The method of claim 9, wherein rotating the received image by the predetermined angle and re-applying the trained model to the rotated image, until determining that the rotated image comprises at least some text of the predetermined type in the predetermined orientation range consistent with the positive samples or the received image is rotated a predetermined number of degrees comprises performing the following one or more rotations in a same direction:

rotating the image by 90 degrees from the original orientation and re-applying the trained model to determine if the rotated image comprises at least some text in the predetermined orientation range;

rotating the image by 180 degrees from the original orientation and re-applying the trained model to determine if the rotated image comprises at least some text in the predetermined orientation range; and rotating the image by 270 degrees from the original orientation and re-applying the trained model to determine if the rotated image comprises at least some text in the predetermined orientation range.

* * * * *